Patented June 14, 1949

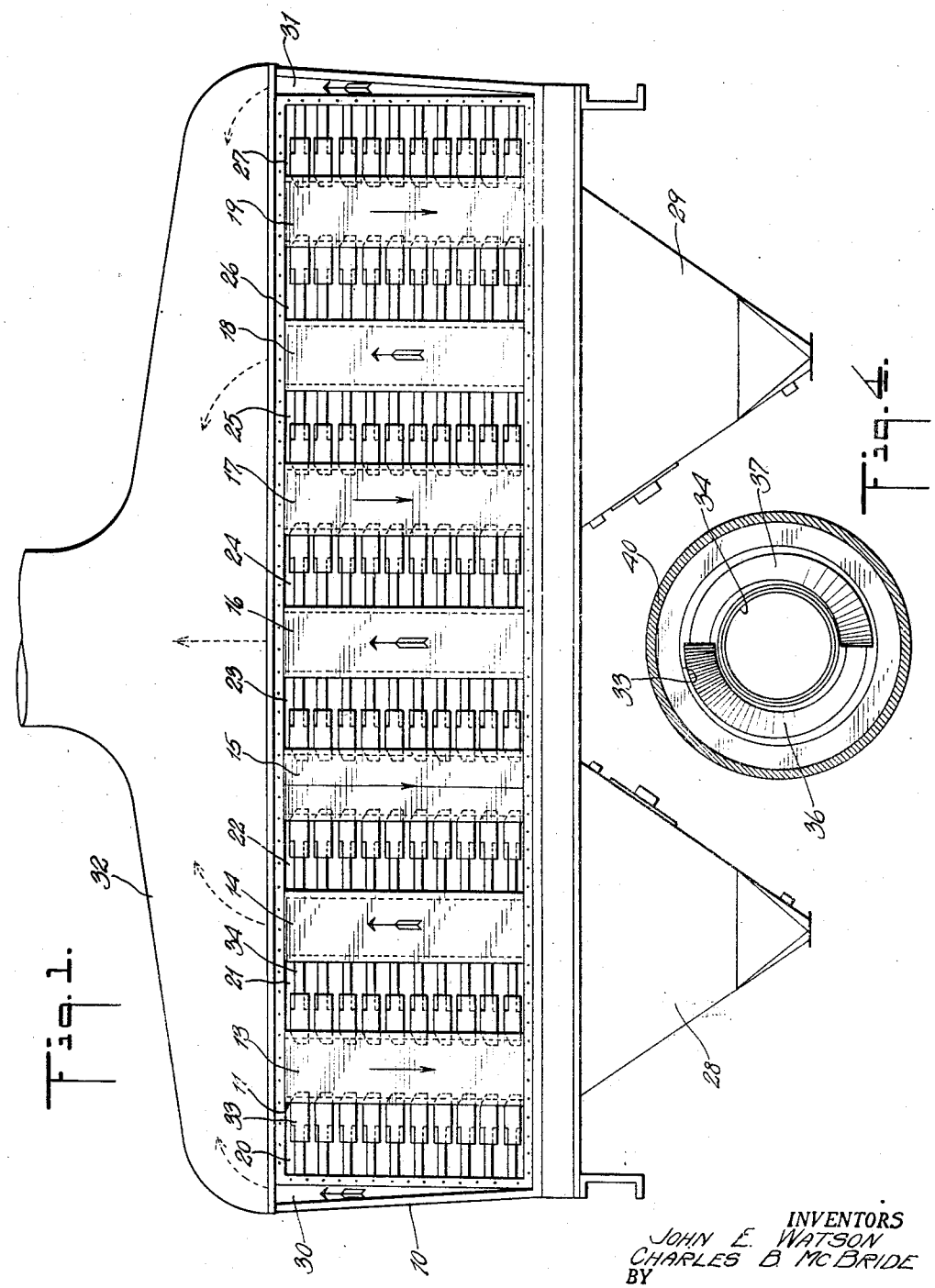

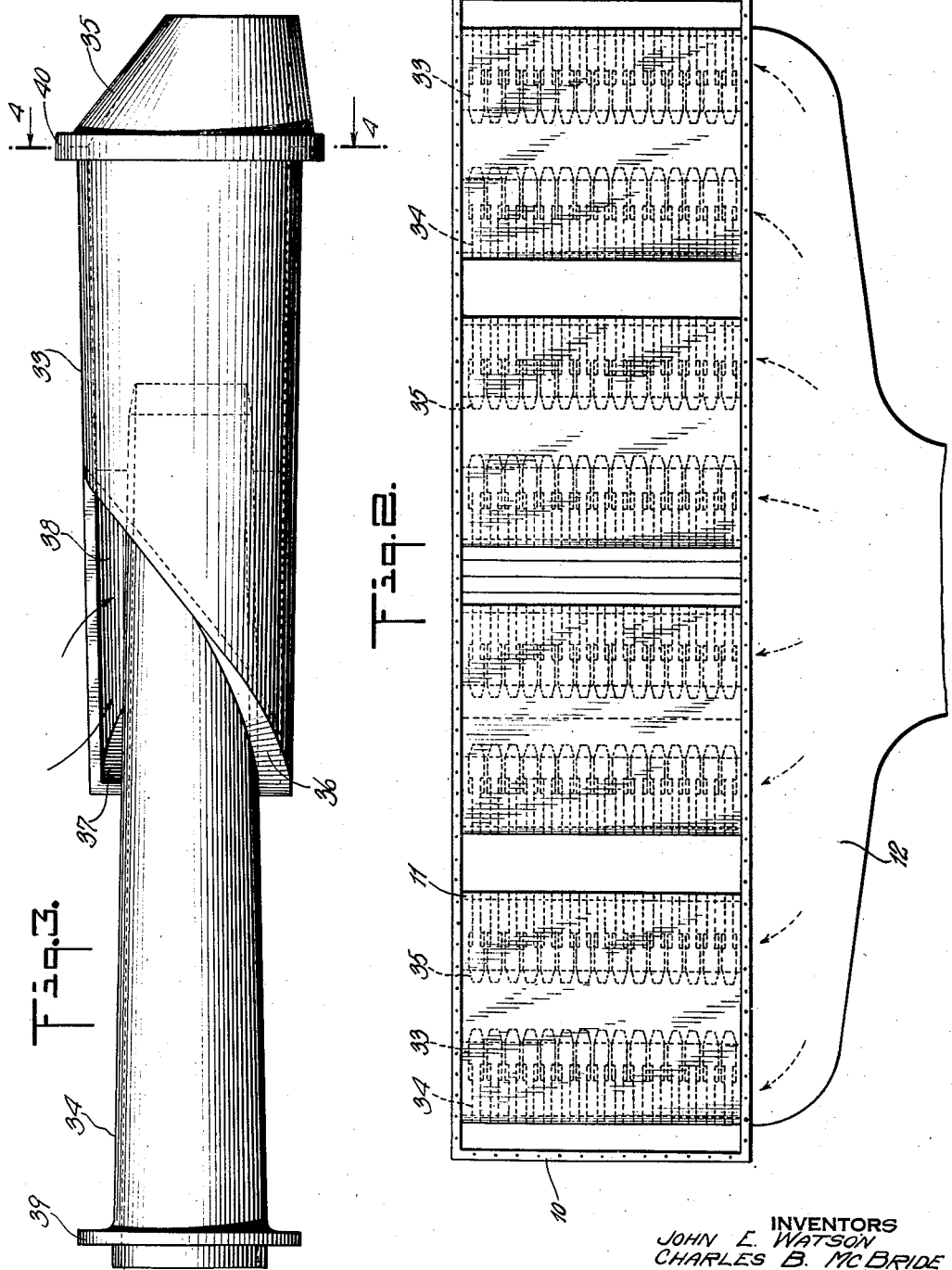

2,472,995

UNITED STATES PATENT OFFICE 2,472,995

APPARATUS FOR SEPARATING SUSPENDED PARTICLES FROM GASES

John E. Watson, Westport, Conn., and Charles B. McBride, Port Chester, N. Y., assignors to The Aerotec Corporation, Greenwich, Conn., a corporation of Connecticut Application July 13, 1946, Serial No. 683,332

7 Claims. (Cl. 183—80)

Our present invention relates to apparatus for separating suspended particles from gases and more particularly to apparatus for separating the particles centrifugally.

Suspended particles have been separated centrifugally from gases in which they were carried by passing the gases in a whirling or spiral path in centrifugal separators or tubes in such a manner that the suspended particles were thrown centrifugally against the wall of the tube and progressed to the exit while the cleaned gas passed centrally upwardly through an off-take pipe.

Heretofore the centrifugal separators or tubes have generally been placed with their axes vertical, or sufficiently inclined toward the vertical, to enable the separated dust to fall downwardly by gravity out of the tubes or separators particularly when the discharge end was narrowed or contracted or provided with a conical outlet. This imposed a limitation upon these separators where the floor space or area available for the separators was limited.

In our present invention we provide a construction of centrifugal separating tubes which enables them to be placed in a horizontal or substantially horizontal position so that they may be positioned in successive tiers so that the number of tubes that may be employed is not dependent upon the ground area available for the apparatus.

In our invention we provide a dust outlet for the tubes that enables the dust to flow or be ejected effectively from the tubes in horizontal position. Also we provide an inlet arrangement which enables the tubes to be closely spaced without interfering with the free and equal flow of the gas to the respective tubes.

The various features of our invention are illustrated by way of example in the accompanying drawings in which Fig. 1 is a front elevation of a centrifugal separating apparatus embodying a preferred form of our invention;

Fig. 2 is a plan view of the apparatus shown in Fig. 1, the off-take duct being removed to show the arrangement and construction of the centrifugal separating tubes;

Fig. 3 is a side view of a centrifugal separating tube embodying a preferred form of our invention, and Fig. 4 is a vertical section of a centrifugal tube taken on line 4—4 of Fig. 3.

In the embodiment of the invention shown in the accompanying drawings, the centrifugal separating tubes are mounted in a chamber 10 which is provided at spaced intervals with vertical partitions 11 which divide the chamber 10 into a series of adjacent vertical compartments. As indicated in Fig. 1 the front of the chamber 10 is open to a supply conduit 12. The spaces between alternate walls are closed, however, by vertical front partitions forming compartments 13, 14, 15, 16, 17, 18 and 19 closed to the supply duct 12 and leaving a series of plenum compartments 20, 21, 22, 23, 24, 25, 26 and 27 open to receive dust laden gases from the supply duct 12. Alternate closed compartments, 13, 15, 17 and 19 are arranged to receive dust separated from the gases and are open at their lower ends to deliver the dust into bins 28 and 29 respectively. The remaining closed compartments, 14, 16 and 18, and a pair of end compartments 30 and 31, are off-take compartments to receive gases freed from dust and open upwardly into an off-take duct 32.

Each of the plenum compartments 20—27 contains a number of centrifugal tubes 33 which may be arranged in successive tiers, that is, with certain tiers or tubes positioned above the lower tiers or tubes. Each of the centrifugal tubes 33 has an open end delivering into one of the dust-receiving compartments 13, 15, 17 or 19, and an off-take pipe 34 to deliver cleaned gases into the off-take compartments 14, 16, 18, 30 and 31.

In the preferred embodiment illustrated in the accompanying drawings, the centrifugal tubes are arranged symmetrically with respect to the dust compartments 13, 15, 17 and 19 so that each dust compartment receives the dust separated in centrifugal tubes of the plenum chamber on each side. Similarly the centrifugal tubes are arranged symmetrically with respect to the off-take compartments 14, 16 and 18 so that each of these compartments receives cleaned gas from the centrifugal tubes of the plenum chamber on opposite sides. This arrangement gives the greatest economy of space or ground area. It is apparent, however, that where conditions require this symmetrical arrangement need not be used and that the number of compartments and their shape and size may be changed or adjusted to suit varying conditions.

The centrifugal tubes of our invention as shown on a larger scale in Figs. 3 and 4 are particularly suited for the above horizontal arrangement.

The centrifugal tubes 33 are of a generally cylindrical shape with the off-take pipe 34 arranged coaxially therewith and extending from one end into the tube to form an annular centrifugal separating space. The opposite end of the tube is contracted by means of an oblique truncated cone 35, the apex of which is below the projected axis of the tube. As shown in Fig. 3, by way of example, the axis of the cone is on a projection of the lowermost element of the tubular cylinder 33 so that the lowermost parts of the cone and tube are in alignment and horizontal. It will be understood that the axis of the cone may vary somewhat from the above position.

Gases entering the plenum chamber are caused to circulate in the annular space between the tube 33 and the off-take tube 34 in a spiral path which throws the suspended particles outwardly against the inner surface of the tubes 33 separating them and giving them a lengthwise component of momentum as well as a tangential momentum. This carries these particles to the dust outlet end of the tube. As these projected particles reach the cone 35 they continue freely on their path to the outer edge of the cone and are discharged in the respective dust compartments.

By having the cone, or frustum of the cone, oblique downwardly, the passage of the particles is greatly facilitated and a disturbance or eddying of the gases at the outlet of the tube is minimized as is also any tendency for air or gas to circulate from the dust receiving compartment into the centrifugal tube.

In order to enable the tubes to be spaced as closely as possible, or giving the gas entering the tube a generally tangential or circulatory and spiral direction, the part of the tube about the off-take pipe 34 is open at its end and provided with a spiral partition or partitions 36 and 37 extending from the end of the tube toward, but short of, the inner end of the off-take pipe 34. The wall of the tube is then cut away or open from the end to the partition to form an approximately longitudinal opening or openings 38 for the entrance of dust laden gases to be treated. The wall of the tube may also be cut away or open from the opening or openings 38 to the spirals 36 and 37. Gases may, therefore, flow freely about the off-take pipe 34 and in a generally helical direction into the openings 38 even though the tubes be placed very close together.

In this way the gases are given a spiral direction as they enter the annular space between the tube and the off-take pipe even though the gases flow to the various centrifugal tubes through the relatively wide or free space between the off-take pipes 34. In this way a free flow and distribution of the gases of the centrifugal tubes may be obtained with a much closer spacing of the tubes than would otherwise be possible.

The off-take pipe is provided with a flange 39 which fits tightly against one of the partitions 11 and the cone 35 is similarly provided with a flange 40 which fits against the opposite partition thus holding the centrifugal tubes fixed in position. The off-take pipe 34 may be slightly tapered to enable it to be inserted endwise between the spiral vanes 36 and 37.

In the operation of the apparatus dust laden gases supplied through the supply duct 12 divide and pass into the plenum compartments 20—27 in which the gas is distributed evenly to the several centrifugal tubes. In passing through the centrifugal tubes the suspended particles are thrown centrifugally outwardly and given a momentum into and through the cone 35 from which they are dropped into the respective dust compartments 13, 15, 17 and 19. The cleaned gas is withdrawn from the central part of the tubes into the off-take pipe 34 and thence into the off-take compartments 14, 16, 18, 30 and 31 and there it is withdrawn into the off-take duct 32. As shown in the embodiment the off-take duct may be positioned on the top of the chamber 10 but it will be apparent that it could equally well be positioned at the back or side opposite the supply duct 12.

What we claim is:

1. Centrifugal separating apparatus which comprises a centrifugal tube, an off-take pipe extending axially into said tube at one end thereof, said tube having an inlet delivering in a rotatory direction to the space about said pipe and having a converging particle discharge passage at the opposite end of said tube, the axis of said discharge passage being inclined to the axis of said tube.

2. Centrifugal separating apparatus which comprises a centrifugal tube, an off-take pipe extending axially into said tube at one end thereof, said tube having an inlet delivering in a rotatory direction to the space about said pipe, the end of said tube opposite said off-take pipe converging toward one side of said tube.

3. Centrifugal separating apparatus which comprises a centrifugal tube, an off-take pipe extending axially into said tube through one end thereof, said tube having an inlet delivering in a rotatory direction to the space about said pipe, and an oblique truncated cone extending from the end of said tube opposite said off-take pipe, the apex of said cone being in alignment with an extension of an element of said tube.

4. Centrifugal separating apparatus which comprises a centrifugal tube, an off-take pipe extending axially into said tube through one end thereof to form an annular space within said tube, said tube having an inlet delivering in a rotatory direction to said annular space, the end of said tube opposite said off-take pipe converging on an oblique frusto-conical curvature with the apex of said frusto-conical surface offset from the axis of said tube.

5. Centrifugal separating apparatus which comprises a centrifugal tube, an off-take pipe extending axially into said tube through one end thereof, a vane extending spirally between said tube and said outlet pipe, said tube being open at said end, the opposite end of said tube converging to an opening off-center to the axis of said tube.

6. Centrifugal separating apparatus which comprises a centrifugal tube, an off-take pipe extending axially into said tube through one end thereof to form an annular space within said tube, said tube having an inlet delivering in a rotatory direction to said annular space, the opposite end of said tube converging to an opening off-center to the axis of said tube.

7. Apparatus for separating suspended particles from gases which comprises, in alternating horizontal succession, dust and off-take chambers, and plenum chambers one between each dust chamber and the next adjacent off-take chamber, horizontal centrifugal tubes in each said plenum chamber, each centrifugal tube delivering at one end into the adjacent dust chamber and having a co-axial off-take pipe delivering from its opposite end into the adjacent off-take chamber, said off-take pipe extending into said centrifugal tube to form an annular space therein and said centrifugal tube having segments cut from its wall near the end opposite said dust chamber, to form for each segment a longitudinal edge ending short of the end of said off-take pipe within said tube and a helical edge extending from one end of said longitudinal edge to the opposite end of the longitudinal edge of the next adjacent segment and having a wall extending from said helical edge to said off-take pipe.

JOHN E. WATSON.
CHARLES B. McBRIDE.

REFERENCES CITED

The following references are of record in the file of this patent:

UNITED STATES PATENTS

| Number | Name | Date |
|---|---|---|
| 770,582 | Hollingsworth | Sept. 20, 1904 |
| 1,229,471 | Jones et al. | June 12, 1917 |
| 1,527,235 | Taylor | Feb. 24, 1925 |
| 1,735,298 | Pfeffer | Nov. 12, 1929 |
| 2,188,206 | Pfeffer | Jan. 23, 1940 |
| 2,323,708 | Danz | July 6, 1943 |

FOREIGN PATENTS

| Number | Country | Date |
|---|---|---|
| 445,245 | Great Britain | Apr. 6, 1936 |
| 626,855 | France | May 21, 1927 |